Aug. 23, 1927. 1,639,829
M. H. WINSLOW
MEANS FOR PREVENTING SAG AND PROTECTING BEARINGS
OF PLATFORM WEIGHING SCALES
Filed Jan. 19, 1926  3 Sheets-Sheet 1
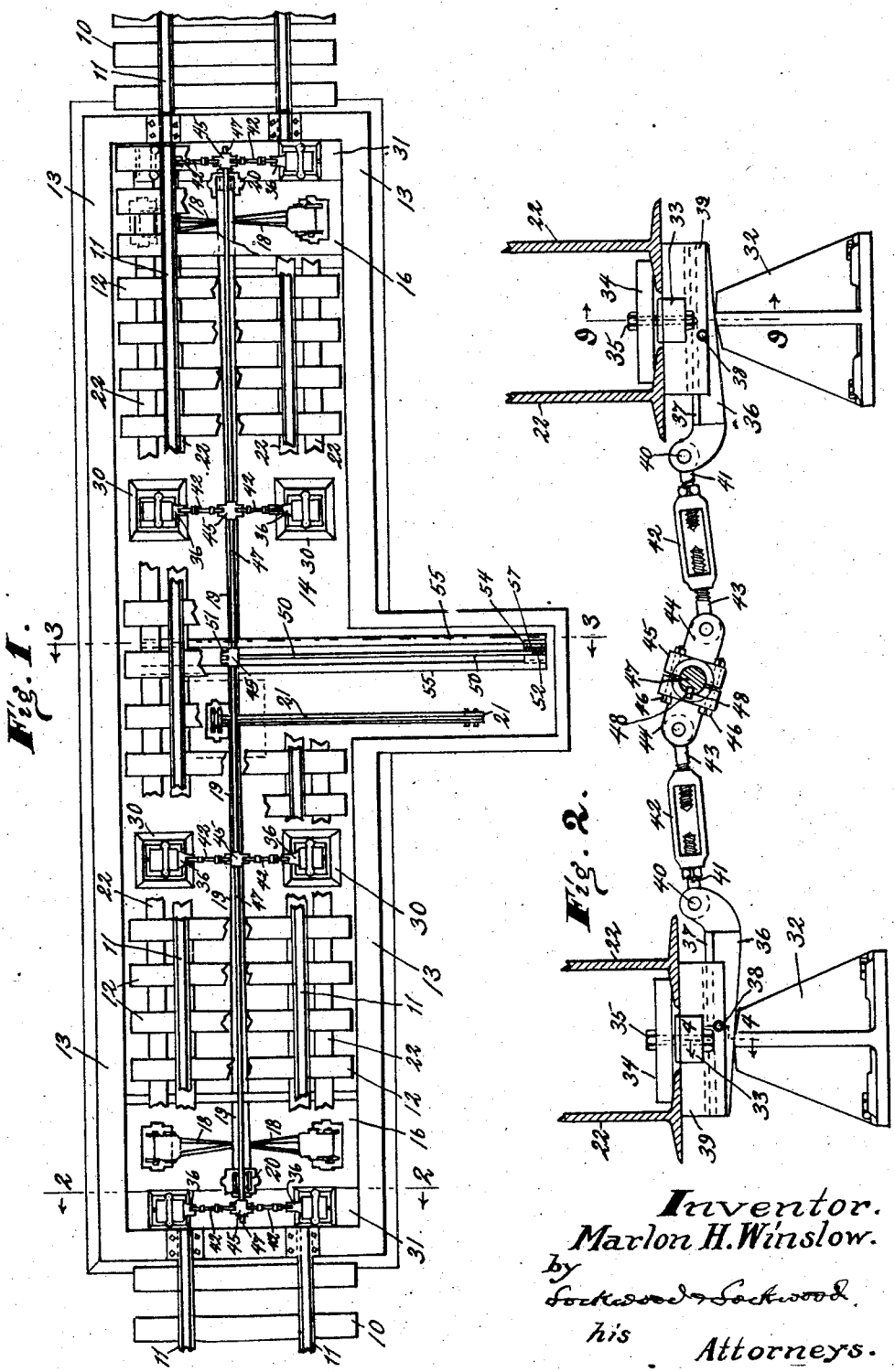
Inventor.
Marlon H. Winslow.
by
Lockwood & Lockwood
his Attorneys.

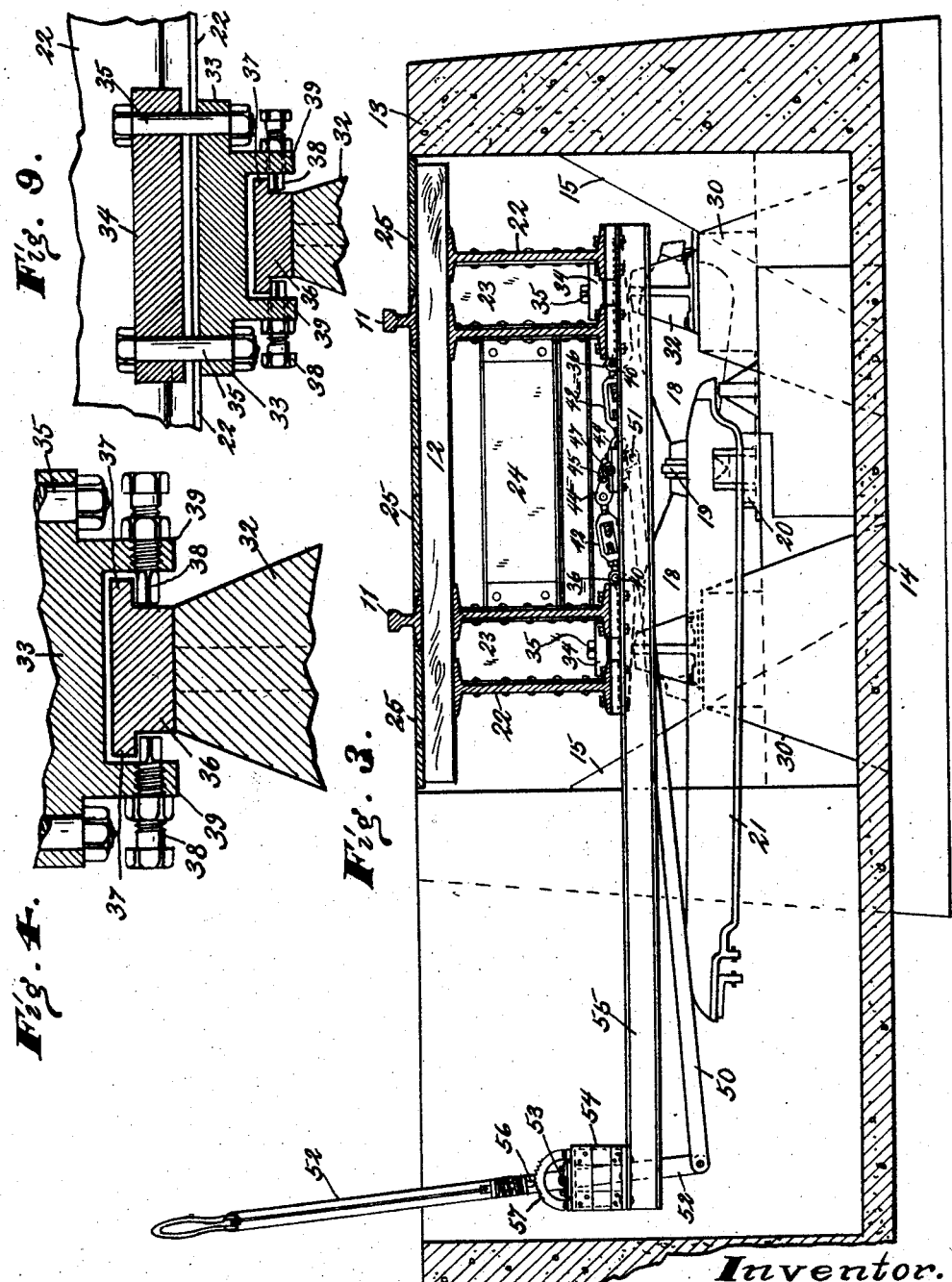

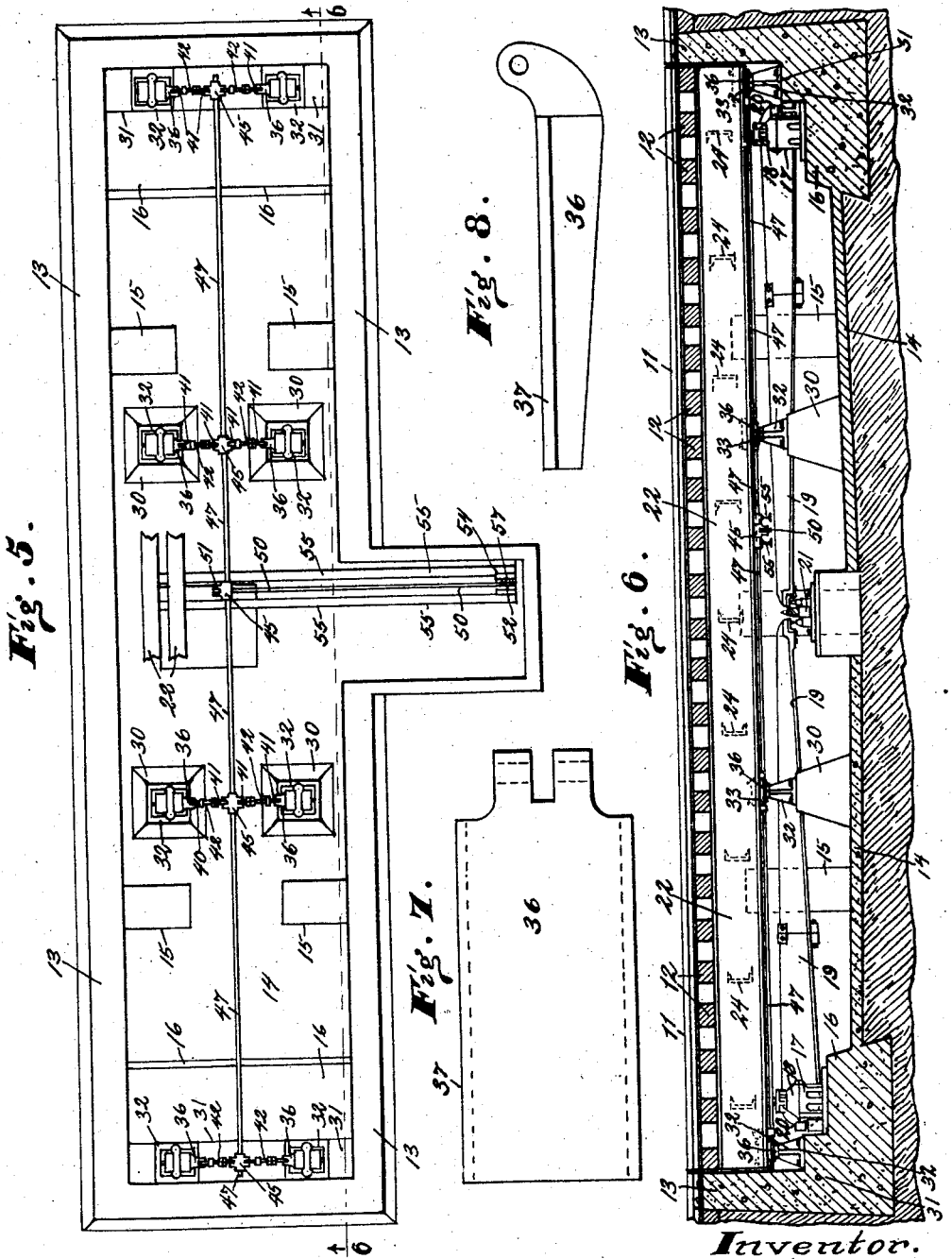

Patented Aug. 23, 1927.

1,639,829

UNITED STATES PATENT OFFICE.

MARLON H. WINSLOW, OF TERRE HAUTE, INDIANA.

MEANS FOR PREVENTING SAG AND PROTECTING BEARINGS OF PLATFORM WEIGHING SCALES.

Application filed January 19, 1926. Serial No. 82,206.

The object of this invention is to prevent the sagging of weigh bridge girders of railway and other platform weighing scales when the platform is subjected to a load or use while not being used for weighing.

As railway and like scales have been heretofore built and employed, it has been necessary to employ a double track or side track or dead rail equipment for the locomotive to run on in its work at other times than when the scale is being used to weigh. This is to prevent the travel back and forth of locomotives and trains from running over the scales and injuring them, or causing their girders to sag under such heavy traffic. Thus when the dead rail equipment is employed it is necessary to stop the train four times to get over the scale.

The above objectionable features are avoided by this invention so that it renders the side track unnecessary and also a dead rail equipment and saves stopping the train four times to get over the scale using the dead rail equipment. With this invention the scale is arranged so that the locomotive or train can go back and forth in switching or for any other purpose, running over the scales, without any injury to them. Hence only one track is necessary and no dead rail equipment required.

The chief feature of the invention consists in providing a wedging or blocking mechanism for wedging up the bridge girders while the scales are not being used for weighing purposes so that they will withstand the weight and usage of locomotive traffic without injuring the scale.

In other words in such use the larger part of the load comes on the wedging or blocking mechanism instead of on the knife edge bearings of the scale.

The full nature of the invention will be understood from the accompanying drawings and the following description and claims.

In the drawings:

Figure 1 is a plan view of a railway track provided with a two-section railway platform scale, parts being shown by dotted lines and parts broken away; Fig. 2 is a cross section on the line 2—2 of Fig. 1 with the upper part of the scale broken away and trackage omitted; Fig. 3 is a transverse vertical section through the device on the line 3—3 of Fig. 1, parts being broken away; Fig. 4 is a vertical section on the line 4—4 of Fig. 2, through a portion of the mechanism, on an enlarged scale, parts being broken away, showing means for guiding a wedge; Fig. 5 is a plan view of the wedging mechanism and scale frame with the weighing elements of the scale omitted for clearness; Fig. 6 is a longitudinal vertical section of Fig. 5 with the weighing elements of the scale shown; Fig. 7 is a plan view of one of the wedges; Fig. 8 is a side view of said wedge; and Fig. 9 is a vertical section on the line 9—9 of Fig. 2.

This invention can be used in combination with various kinds of platform scales and therefore is not limited to the particular railway scale herein shown. To illustrate the invention, however, in the drawings herein there are shown sections of a railway track 10 with a railway scale therein having longitudinal rails 11 on cross ties 12 so as to make a continuous railway track on which locomotives and trains can travel for any purpose, while the scale is not being used for weighing, or can be stopped on the scale for weighing purposes.

There is a scale pit as shown in Figs. 1 and 3, formed by cement walls 13 and a bottom 14. There are also pilaster braces 15, as shown in Fig. 3, for bracing the cement walls. At each end of the pit there is a transverse pillow block 16 and on each of them is mounted a pair of bearing blocks 17 for mounting the cross beams 18 in the usual or any desired manner of construction, and the load received by the cross beams 18 is transmitted by them to long longitudinal beams 19 fulcrumed near each end of the pit at 20 and extending in alinement with each other toward the middle of the scale, as shown in Fig. 6, where they transmit the load to the transverse central weighing beam 21 which, at its outer end, is connected by means not shown to the usual scale beams above, whereby the weight of the load is indicated. The transverse beams 18 receive the load through two pairs of bridge girders 22, as shown in Fig. 3. These girders are heavy I-beams and each pair is secured together by plates 23, and the two pairs are secured together and braced by channel irons 24, as seen in Figs. 3 and 6. This makes an extremely strong and heavy bridge structure on which the cross ties 12 are laid transversely of the track, as seen in Figs. 3 and 6, and on them the rails 11 are laid and also suitable flooring 25.

The foregoing constitutes the main elements of the weighing scale construction, but it is to be understood that each beam 18, 19 and 20 is mounted with the usual knife edge bearing construction, details of which are not herein presented. To this construction or any other similar platform weighing scale construction I have added means readily operative for temporarily assuming the weight of the girder frame and load and taking their weight off of the knife edge bearings and support them in absolutely unchangeable position so as not only to relieve the knife edge bearings, but to prevent the sagging of the girders when the scale or track is used for other purposes than weighing.

The newly added features are the following:

In the pit at intervals I provide pairs of pillow blocks 30 and 31. There are eight of these in the construction shown, two at each end being upward steps from pillow blocks 16 and two pairs near the middle. On these I secure bottom bearing blocks 32 in pairs under the girders 22, as shown in Figs. 3, 4 and 6. They taper upward and their upper ends are beveled substantially as shown in Fig. 2, and extend almost to the bottom of the girders 22. Above each bottom bearing block 32 I provide an upper bearing block 33, as seen in Fig. 2, that extends transversely of the bottom bearing block 32 and transversely of the girders 22 and immediately under them and it is secured to and held in place by the girders through the instrumentality of a cross bar 34 that lies on the lower flanges of the girders 22, as shown in Fig. 9. Bolts 35 extend through the bar 34 and through the lateral portions of the upper bearing block 33, as seen in Figs. 4 and 9. When these bolts are tightened up the upper bearing blocks 33 will be simultaneously secured to the bottom of the girders and immediately from the bottom bearing blocks 32. In the construction shown there are eight of these, but the number may be varied according to the size of the scale construction.

Between each bottom bearing block 32 and top bearing block 33 a wedge block 36 is introduced, as seen in Figs. 2 and 4. The shape of the wedge is shown by the plan view in Fig. 7 and the side view in Fig. 8. It extends horizontally between said top and bottom bearing blocks and along its upper edges it has laterally extending flanges 37 that cooperate with the guide bolts 38 extending through downwardly extending flanges 39 from the top bearing block 33, as seen in Fig. 4. These bolts 38 are to guide the longitudinal movement of the wedge and hold it in place between the bearing blocks and prevent its escape. Each pair of wedges is operated by the toggle construction shown in Fig. 2. Thus each wedge has an upwardly turned end having two eyes 40 for pivoting the screw bolts 41 that project into the turn-buckle 42 and in the other end of the turn-buckle there is another screw bolt 43 pivoted to one end of a crank arm 44 or half piece extending from the crank arm cap 45. This construction for each wedge is identical and the two crank arm caps 45 for the two wedge operating constructions are clamped by bolts 46 tightly to a shaft 47 and keyed by keys 48 so that when the shaft is turned in one direction it will push the wedge blocks tightly in between the top and bottom blocks 32 and 33, as shown in Fig. 2, and when the shaft 47 is reversed it will pull out those wedge blocks to some extent. The shaft 47 extends for the full length of the scale, as seen in Figs. 1 and 5, so that it will operate all of the wedge blocks 36 simultaneously alike. The shaft 47 is oscillated by a connecting rod 50, as seen in Fig. 3, that at its inner end is connected to an arm 51 on said shaft and at its other end is pivoted to the lower end of a hand lever 52 fulcrumed at 53 in a frame 54 mounted on a pair of I-beams 55 which are bolted to the bottom of the girders 32. The hand lever 52 is locked in position by a spring actuated pawl 56 and a rack 57.

The operation of the wedging mechanism is as follows:

When the scales are being used for weighing the hand lever 52 is pushed inward which will pull out the wedge blocks 36 to some extent so that the weight of the girders and load will come down upon the knife edge bearings of the weighing beams and the parts operate as a scale in weighing.

When the scale is not being used and there is no load on the scale, the top of the hand lever 52 is moved outwardly which will tend to straighten the toggle mechanism, as shown in Fig. 2, and force the wedges in between the top and bottom bearings 33 and 32 tightly and thus cause the girders and trackage on them to be wholly supported for the time being by the bottom bearing blocks 32 and the knife edge bearings then will be freed from the support of the load or girders. While in that condition locomotives and trains can run across the scales for switching or any other purpose and the girders cannot sag nor will the knife edge bearings be injured thereby. When again it is desired to weigh, the bearing blocks 36 are withdrawn somewhat so as to let the knife edge bearings receive the weight of the load.

With this construction no double trackage or dead rail equipment is required and it becomes unnecessary to stop the train four times to get over the scale using dead rails.

One movement of the hand lever 52 operates all the wedge blocks 36 simultaneously and equally. The invention, however, is not limited to the particular means shown for operating the wedge blocks as they might be operated by other means that would occur to an engineer.

I claim as my invention:

1. The combination with the girders of a platform weighing scale, of bottom bearing blocks under said girders, top bearing blocks above the bottom bearing blocks and in position to support the girders, and a wedge block adapted to be driven in between each set of top and bottom bearing blocks and released therefrom, each top bearing block having a longitudinal chamber in its underside for receiving, guiding and holding the wedge block in place on the bottom bearing block.

2. The combination with the girders of a platform weighing scale, of bottom bearing blocks under said girders, top bearing blocks above the bottom bearing blocks and in position to support the girders, a wedge block adapted to be driven in between each set of top and bottom bearing blocks and released therefrom, each top bearing block having a chamber in its underside to receive the wedge block, and means associated with the top bearing block for guiding the wedge block and holding it in the top bearing block during adjustment and use.

3. The combination with the girders of a platform weighing scale, of bottom bearing blocks under said girders, top bearing blocks above the bottom bearing blocks and in position to support the girders, a wedge block adapted to be driven in between each set of top and bottom bearing blocks and released therefrom, the top bearing block having a chamber in its underside, and each wedge block having lateral and longitudinally extending flanges, and screws extending through the side walls of the top bearing block and beneath the flanges on the wedge block for guiding the wedge block and holding it in the top bearing block during adjustment and use.

4. The combination with the girders of a platform weighing scale, of bottom bearing blocks under said girders, top bearing blocks above the bottom bearing blocks and in position to support the girders, and a wedge block adapted to be driven in between each set of top and bottom bearing blocks and released therefrom, the bottom bearing block having its upper end sloping downward from the central portion thereof so that the wedge block will rest principally upon the central part of the top of the bottom bearing block.

In witness whereof, I have hereunto affixed my signature.

MARLON H. WINSLOW.